United States Patent [19]

Stehning

[11] Patent Number: 4,626,264
[45] Date of Patent: Dec. 2, 1986

[54] SCRUBBER FOR AN APPARATUS FOR THE DESULFURIZATION OF FLUE GAS

[75] Inventor: Werner Stehning, Dorsten, Fed. Rep. of Germany

[73] Assignee: Gottfried Bischopp Bau Kompl. Gasreinigungs- und Wasseruckkuhlanlagen GmbH & Co. Kommanditgesellschaft, Essen, Fed. Rep. of Germany

[21] Appl. No.: 713,455

[22] Filed: Mar. 19, 1985

[30] Foreign Application Priority Data

Mar. 20, 1984 [DE] Fed. Rep. of Germany ....... 3410110

[51] Int. Cl.⁴ .......................................... B01D 45/08
[52] U.S. Cl. .................. 55/213; 55/257 PV; 55/440
[58] Field of Search ............... 55/257 PV, 212, 213, 55/440

[56] References Cited

U.S. PATENT DOCUMENTS 1,452,204  4/1923  Luetscher ............................ 55/440
1,879,107  9/1932  Couch .................................. 55/440
4,515,754  5/1985  Stehning ................................ 261/2
4,526,764  7/1985  Stehning ............................ 423/242
4,539,024  9/1985  Stehning et al. ............... 55/257 PV
4,539,184  9/1985  Stehning ............................. 55/223

FOREIGN PATENT DOCUMENTS 2854931  10/1980  Fed. Rep. of Germany ........ 55/440
9938  of 1908  United Kingdom .................. 55/440

Primary Examiner—Tim Miles
Attorney, Agent, or Firm—Karl F. Ross; Herbert Dubno

[57] ABSTRACT

A scrubber for the desulfurization of flue gases in which the flue gas rises through the recirculated scrubbing liquid which can contain calcium compounds, has a liquid separator at the head of the column formed by a number of impingement baffle registers or units in an annular array. The gas collecting passage surrounding this array is provided with flaps or sliders as closure elements to isolate at least one segment of this passage and thereby accommodating the scrubbing to less than full gas loading.

10 Claims, 4 Drawing Figures

SCRUBBER FOR AN APPARATUS FOR THE DESULFURIZATION OF FLUE GAS

CROSS REFERENCE TO RELATED APPLICATIONS

This application is related to the commonly assigned copending applications:

Ser. No. 493,984, filed May 12, 1983, now U.S. Pat. No. 4,539,184 issued Sept. 3, 1985;

Ser. No. 515,919, filed July 20, 1983, now U.S. Pat. No. 4,515,754 issued Aug. 7, 1985;

Ser. No. 570,038, filed Jan. 11, 1984, now U.S. Pat. No. 4,539,024 issued Sept. 3, 1985;

Ser. No. 580,645, filed Feb. 16, 1984, now U.S. Pat. No. 4,526,764 issued July 2, 1985;

Ser. No. 707,430, filed Mar. 1, 1985; and

Ser. No. 713,423 filed Mar. 19, 1985 entitled Scrubber for the Desulfurization of Flue Gases.

Field of the Invention

Our present invention relates to a scrubber forming part of an apparatus for the desulfurization of flue gases and, more particularly, to improvements in scrubbers of the type generally described in the aforementioned copending applications and for similar purposes, i.e. the desulfurization and scrubbing of flue gases and especially the flue gases derived from an electricity-generating power-plant boiler combustion chamber.

BACKGROUND OF THE INVENTION

For literature dealing with the background of this invention, reference may be had to the patents and publications described in or cited in the files of the above-identified applications.

Generally speaking, for environmental protection purposes it is desirable to remove contaminants from the flue gases of fossil fuel power plants and, particularly, to remove the sulfur oxides which are generally present in the flue gases produced by most fossil fuels.

While various methods have been proposed for this purpose, a most effective technique is to subject the flue gases to a wet scrubbing with a scrubbing liquid which contains calcium compounds e.g. calcium carbonate, calcium hydroxide or calcium oxide, these compounds being referred to generally as "lime" since all serve essentially the same purpose, namely, that of providing the calcium ion in the aqueous scrubbing liquid so that this calcium ion can combine with anions formed by the sulfur oxides to produce, for example, calcium sulfite and calcium bisulfite by absorption of sulfur dioxide from the flue gas. When reference is made to calcium sulfite, therefore, it should be understood that calcium bisulfite may be included.

A scrubbing tower for this purpose is generally upright and is provided with a flue gas inlet at a lower portion of the tower, connected to the power-plant boiler flue, a flue gas outlet in the region of the head of the tower or column, means between the inlet and the outlet for spraying a scrubbing liquid into the gas, and a sump for collecting the scrubbing liquid below this inlet.

The sump may be provided with means for enabling calcium sulfite and/or calcium sulfite which can form in suspension in the scrubbing liquid to be withdrawn, while the flue gas outlet at the head of the tower can be provided with a radial outlet for the flue gas and a droplet separation for removing droplets of scrubbing liquid entrained with the gas.

Conventional droplet separators for this purpose utilize cyclone principles for separating the entrained liquid from the gas and are characterized by the need for high flow velocities so as to operate at efficient ranges for such separators. The high flow velocities, in turn, mean that the pressure drop is considerable and the resulting energy cost is high.

Accordingly, droplet separators have been provided at the head of the tower or column which utilize baffle or impingement separation principles. These separators can be provided in sectors around a central space, an annular collecting passage being formed outwardly of the array of sectors, each of which may be an impingement baffle separator formed from a number of plates.

The flue gas rising centrally into the separator at the head of the column then passes outwardly through the baffle sectors and is collected in the outflow passage to flow to the common radial outlet. The sectoral baffle units are also described herein and in the prior applications where applicable as droplet separator registers.

Naturally, the droplet separator is designed and dimensioned, i.e. the number of sectors or registers is selected and the number of plates and their arrangement are designed to accommodate the maximum flow rate which can be expected.

However, power-generating boilers are frequently operated at less than full output with a corresponding reduction in flue gas generation and, as a result, the scrubber may be operated at less than full gas scrubbing capacity. Under these circumstances the efficiency of the baffle separators drops sharply.

OBJECTS OF THE INVENTION

It is the principal object of the present invention, therefore, to provide a scrubber for the purposes described which can operate at high efficiency even under reduced flue gas input conditions.

Another general object of this invention is to provide a scrubber for the desulfurization of flue gases from power plant boilers which extends the principles set forth in the above-mentioned copending applications.

Yet another object of this invention is to provide a scrubber which wll provide satisfactory droplet separation from the effluent flue gas even under partial loading conditions.

SUMMARY OF THE INVENTION

These objects and others which will become apparent hereinafter are attained, in accordance with the present invention, in a flue gas scrubber of the type described wherein the annular flow passage surrounding the array of sectoral impingement-baffle registers is subdivided into at least two segments by control elements connected to respective operating (e.g. servo) mechanisms or positioning drives for blocking corresponding segments of the annular outflow passage and thereby shutting down the registers communicating with the isolated segment and ensuring that the entire flow is effected through the remaining segments on partial flow operation of the tower or column.

The flow blocking members can be flaps swingable about vertical axes or sliders.

The closure members can also be wing-type or butterfly flaps, jalousie flaps or the like.

If at least two such closures are used and these closures are spaced apart around the peripheral passage, a single segment can be closed off, i.e. the segment between the closures opposite the radial outlet.

This is frequently sufficient to accommodate reduced loads; frequently, however, a more versatile control is desired and the number of closures can be provided in accordance with the number of segments of the passage which are to be isolated and hence the number of sectors or registers which are to be ineffective.

If two closures are provided, and are located diametrically opposite one another, rather than the cut off of 50% of the flow through the annular passage we can isolate segments of the passage in increments of 25%, without effecting full load operation if a permanent partition is provided to subdivide the passage into two halves at a location diametrically opposite the radial outlet.

When the registers or baffle sectors are generally of a rectangular plan configuration, triangular filler bodies can be provided between them and in this case we prefer to dispose the closures at the regions at which these filler bodies are located. The filler bodies can be chambers defined by walls through which there is no flow.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
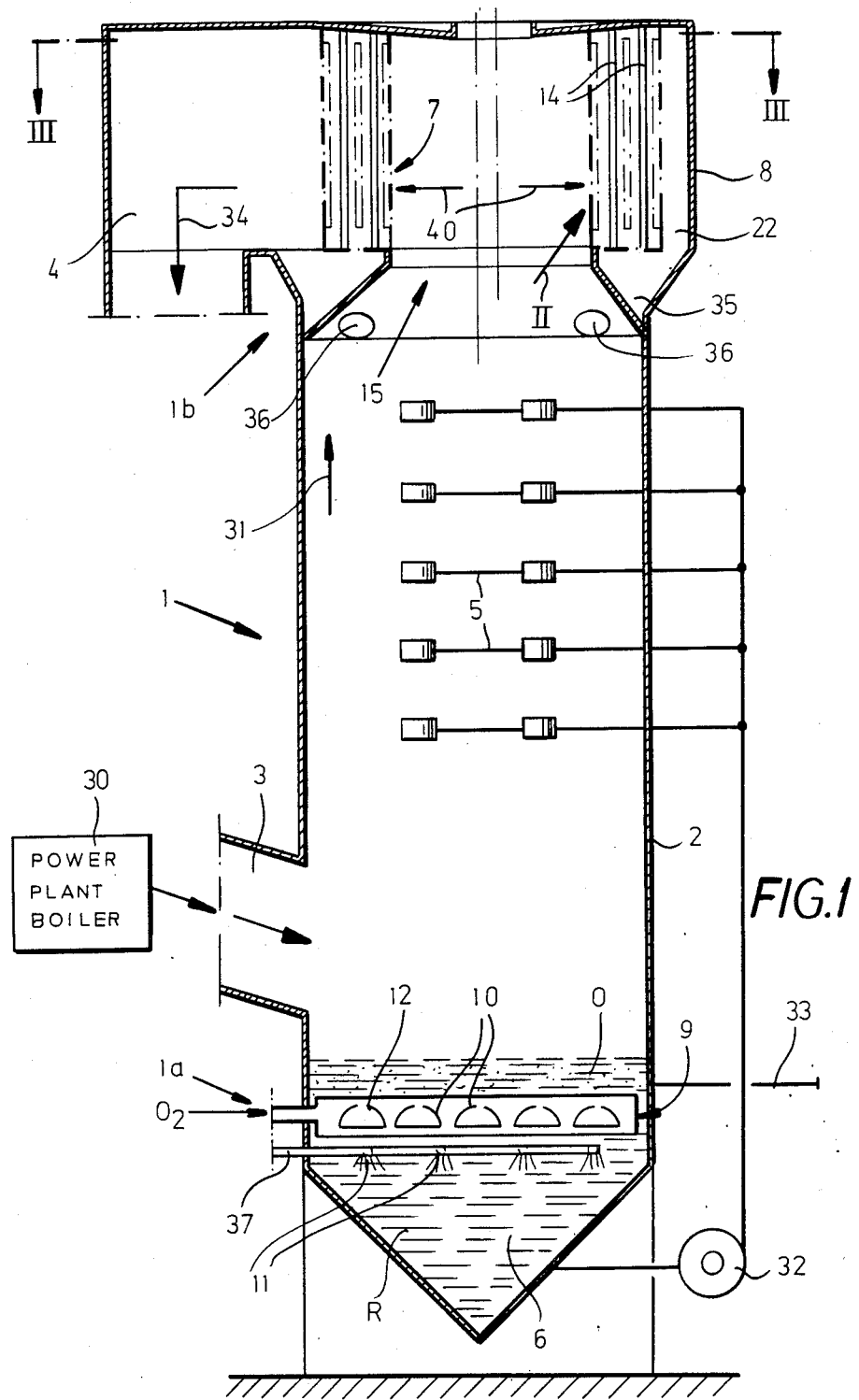
FIG. 1 is a diagrammatic axial section through a scrubbing column in accordance with the invention.

As can be seen from FIG. 1 a scrubbing column 1 comprises a generally cylindrical shell 2 having an inlet 3 connected to the flue of a power plant boiler 30.

The apparatus is provided for the desulfurization of this flue gas.

At a lower portion 1a of the column, below the inlet 3, there is provided a sump 6 for collecting the scrubbing liquid.

At an upper portion 1b of this column and forming the head thereof, there is provided a generally radial flue gas outlet 4.

Means, such as spray nozzles as described in the aforementioned copending applications, are provided at 5 for spraying a scrubbing liquid into the flue gas which flows in the direction of arrow 31 from the inlet to the outlet. The nozzles or spraying means 5 receive the scrubbing liquid from a pump 32 representing means for circulating the scrubbing liquid from the sump 6.

From the sump via a line 33, the calcium sulfite and-/or calcium sulfate suspension can be withdrawn.

The head of the scrubber is also provided with a droplet separator represented generally at 7 and whose function is to collect entrained scrubbing liquid from the scrubbed flue gas which is discharged at 34.

The collected scrubbing liquid flows downwardly along the plate of the separator and is collected in a trough 35 and returned to the sump via the holes 36.

At the lower portion 1a of the scrubber, as is also described in the aforementioned copending applications, a pipe 37 with outlets 11 opening downwardly, is provided to introduce make up scrubbing liquid and the additives. In this case the make up scrubbing liquid and the additives are supplied together as a milk of lime or lime water (aqueous calcium hydroxide solution).

Immediately above the pipe 37, oxygen is introduced through oxygen inlet ducts 10 forming a horizontal grate and defining an air cushion 12. The liquid will not percolate downwardly through the oxygen outlets of the grate which is formed from an array of hoods (see especially Ser. No. 570,038 U.S. Pat. No. 4,539,024) so that an oxidation zone O is formed above a reaction zone R.

As described in these copending applications, therefore, the calcium sulfite is largely oxidized to calcium sulfate which is recovered together with solids scrubbed from the flue gas such as fly ash to form a suspension which has been found to be an advantageous material directly or after processing to constitute a building material.

The scrubbing region between the inlet and the outlet, therefore, forms an absorption zone in which the sulfur dioxide and any sulfur trioxide are absorbed and reacted with the additives (CaO) in the scrubbing liquid to form primary sulfite and a small amount of sulfate ($CaO + SO_2 \rightarrow CaSO_3$; $CaO + SO_3 \rightarrow CaSO_4$)

The sulfite is transformed in the oxidation zone O to sulfate and this does not require a change in the pH value by the addition of sulfuric acid for the most part. The oxidation of the sulfite is effected generally at a pH value below 7, preferably between 4 and 6.5 which can be maintained by the supply of oxygen. As a result calcium sulfate is formed in solution.

Some of the solution passes the bars of the grate since it cannot "rain" through the hoods, and enters the reaction zone R where the pH is lowered by the supply of the calcium hydroxide solution. This increase in pH causes precipitation of the calcium sulfate which is recoverable as gypsum or which can be transformed into gypsum because of the high calcium sulfate content of the recovered suspension. The gypsum-like product can also be recovered from the bottom of the sump.

Figure 2:
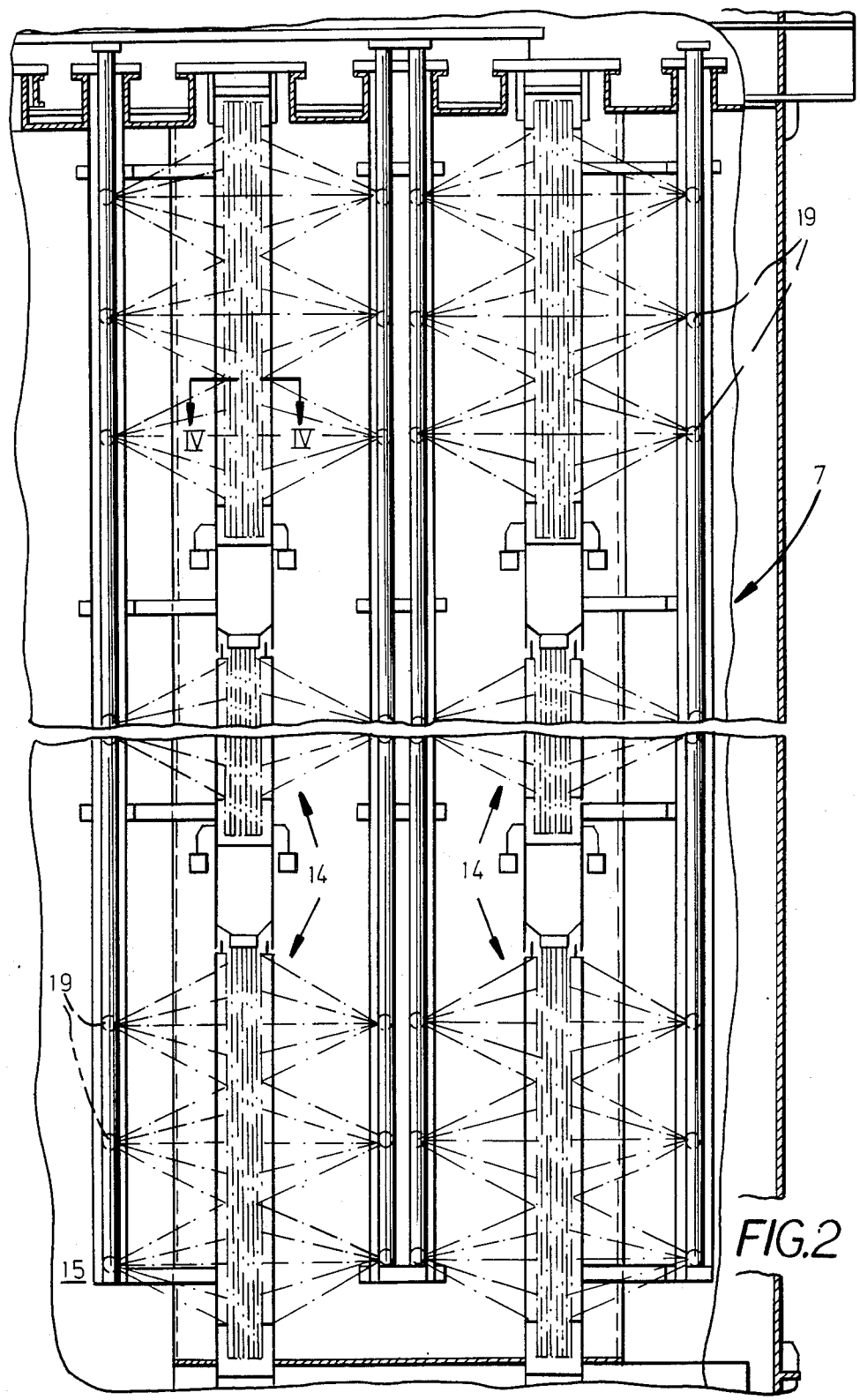
FIG. 2 is a sectional view considerably enlarged with respect to FIG. 1 but still in diagrammatic form of the region II of FIG. 1 and constituting an axial section through the eliminator plates thereof.
Figure 3:
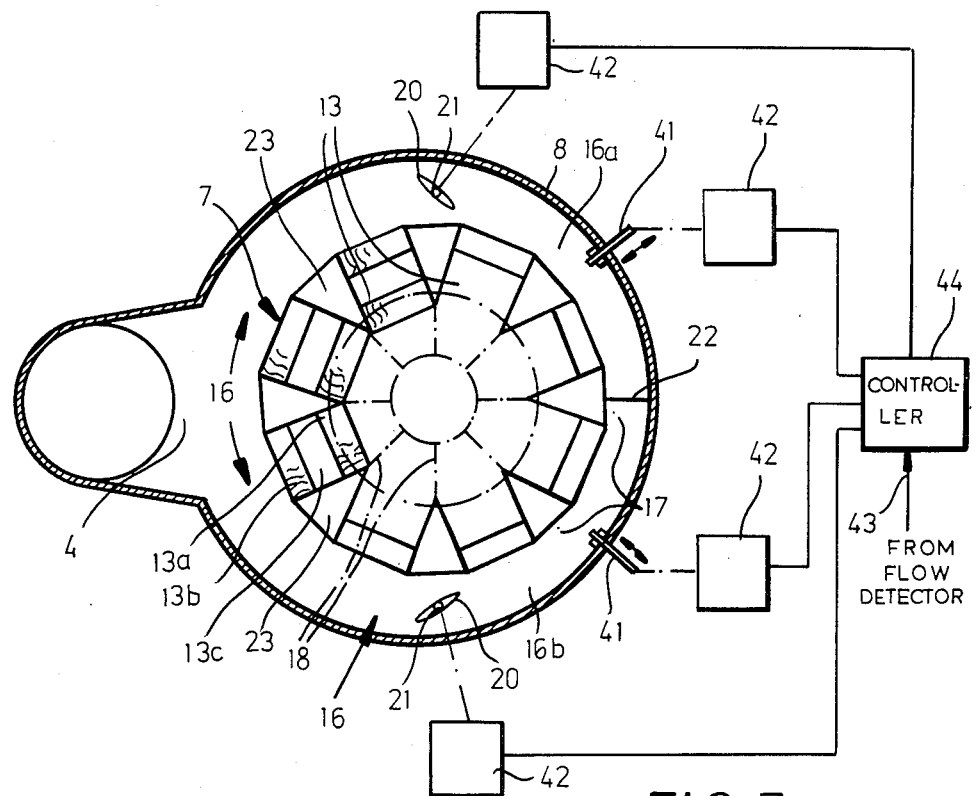
FIG. 3 is a section taken along the line III—III of FIG. 1.
Figure 4:
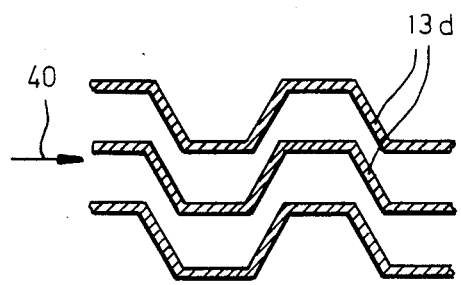
FIG. 4 is a section along the line IV—IV of FIG. 2 showing the zig zag plates forming the impingement-baffle register.

As can be seen from FIGS. 2-4, the separator 7 for the scrubbing liquid comprises a crown or annular array of separating registers or units 13, each of which comprises two sets of plates which are spaced apart in the radial direction. The sets of plates have been represented at 13a and 13b in FIG. 3 and the space between them is showed at 13c. The plates of each set can have a zig zag configuration as shown in FIG. 4 where the plates have been represented at 13d, the radial flow direction being represented at 40. The corrugations or crests and troughs of these plates run vertically.

FIG. 2 shows that even in the vertical direction the plates can be subdivided into vertically spaced sets.

The impingement baffle units have been represented at 14 and are disposed around a central space 15 so that the flow of gas is radially outward as represented by the arrows 40 in FIG. 1.

Surrounding the separator units 14 is an annular collecting passage 16 which communicates with the radial outlet 4 previously mentioned. As is apparent from FIG. 3, the flow cross section of the passage 16 increases as it approaches the radial outlet 4.

Between the sectors providing flow for the flue gas, walls 17 and 18 can be disposed to separate the registers from one another and to block flow between the registers, the walls 18 being optional but, when provided, serving as guides directing the gas to the respective sectors.

The walls 17 close compartments 23 which act as filler bodies and through which there is no radial flow.

Spray nozzles 19 are provided to direct washing liquid spray into and upon the baffle separator plates for washing them down and preventing accumulation of deposited solids thereon.

In the embodiment shown there are eight baffle units in the crown or annular array.

According to the invention, two pivotal flap closures 20 are provided at substantially diametrically opposite locations in the collecting passage 16, across a diameter perpendicular to the diameter along which the radial outlet 4 is provided. The flaps are swingable about vertical pivots 21 and can close off at least one segment of the passage, i.e. the segment to the right of these flaps or closures.

Consequently, the four baffle units on the left hand side of the diameter connecting these flaps will remain operative and the necessary flow rate can be maintained through using separators for optimum separator efficiency, even if the flow of flue gas has been reduced.

Advantageously a partition 22 is provided diametrically opposite the radial outlet 4 to subdivide the collecting passage 16 into two half passages 16a and 16b. In this case, the flaps 20 need not be operated simultaneously, but can be operated selectively to close off increments of 25% of the number of sectors in operation and thereby provide greater control of the available baffle flow cross section with respect to the actual flow. Additional closures can be provided as are represented by the sliders 41 which are displaced radially into and out of the passage 16. The sliders can be substituted for the pivotal flaps and each of the closures are disposed in the region of the filler chamber 23.

The closures are each provided with servo mechanisms 42 for operating same in response to an input 43 from a flow detector to the controller 44 operating the actuators 42 for the closures. In this way the scrubber responds immediately to changes in the flow of flue gas to close down selected sectors in accordance with this flow.

We claim:

1. A scrubber for the desulfurization of a flue gas comprising:
    a column formed at a lower portion with a flue gas inlet, at an upper portion with a head having a radial outlet for discharging scrubbed flue gas, a sump for collecting scrubbing liquid below said inlet, and means between said inlet and said outlet for scrubbing rising flue gas with a scrubbing liquid containing an additive capable of absorbing sulfur oxide, said flue gas entraining scrubbing liquid into said head;
    an array of impingement baffle liquid separators forming sectors disposed around a central space in said head whereby flue gas entering said central space passes radially through said sectors for removal of entrained scrubbing liquid therefrom;
    means forming an annular collecting passage around said array for collecting flue gas from which liquid has been separated, said passage communicating radially with said outlet; and
    at least two closure elements disposed along said passage and adapted to close off from said outlet at least one segment thereof to inactivate a corresponding group of said separators for partial load operation of the scrubber, said closure elements being provided with respective drives for shifting said elements between passage-blocking and passage-opening positions.

2. The scrubber defined in claim 1 wherein said elements are respective flaps pivotal about respective vertical axes.

3. The scrubber defined in claim 1 wherein said elements are sliders.

4. The scrubber defined in claim 1 wherein filler members are provided between said separators to define a wall of said passage and said closure elements are provided in the region of said filler members.

5. A scrubber for the desulfurization of a flue gas comprising:
    a column formed at a lower portion with a flue gas inlet, at an upper portion with a head having a radial outlet for discharging scrubbed flue gas, a sump for collecting scrubbing liquid below said inlet, and means between said inlet and said outlet for scrubbing rising flue gas with a scrubbing liquid containing an additive capable of absorbing sulfur oxide, said flue gas entraining scrubbing liquid into said head;
    an array of impingement baffle liquid separators forming sectors disposed around a central space in said head whereby flue gas entering said central space passes radially through said sectors for removal of entrained scrubbing liquid therefrom;
    means forming an annular collecting passage around said array for collecting flue gas from which liquid has been separated, said passage communicating radially with said outlet; and
    at least two closure elements disposed along said passage and adapted to close off from said outlet at least one segment thereof to inactivate a corresponding group of said separators for partial load operation of the scrubber, said closure elements being provided with respective drives for shifting said elements between passage-blocking and passage-opening positions, said passage being subdivided diametrically opposite said outlet with a partition, said elements being spaced from said partition substantially midway along said passage between said partition and said outlet.

6. A scrubber for the desulfurization of a flue gas comprising:
    a column formed at a lower portion with a flue gas inlet, at an upper portion with a head having a radial outlet for discharging scrubbed flue gas, a sump for collecting scrubbing liquid below said inlet, and means between said inlet and said outlet for scrubbing rising flue gas with a scrubbing liquid containing an additive capable of absorbing sulfur dioxide, said flue gas entraining scrubbing liquid into said head; p1 an array of impingement baffle liquid separators forming sectors disposed around a central space in said head whereby flue gas entering said central space passes radially through said sectors for removal of entrained scrubbing liquid therefrom;
    means forming an annular collecting passage around said array for collecting flue gas from which liquid has been separated, said passage communicating radially with said outlet; and at least two closure elements disposed along said passage and adapted to close off from said outlet at least one segment thereof to inactivate a corresponding group of said separators for partial load operation of the scrubber, said closure elements being provided with respective drives for shifting said elements between passage-blocking and passage-opening positions, filler members being provided between said separators to define a wall of said passage and said closure elements being provided in the region of said filler members, said passage being subdivided diametrically opposite said outlet with a partition, said elements being spaced from said partition substantially midway along said passage between said partition and said outlet.

7. The scrubber defined in claim 6, further comprising means for introducing make up scrubbing liquid into said sump and for introducing said additive into said sump.

8. The scrubber defined in claim 7, further comprising means for introducing oxygen into said sump.

9. The scrubber defined in claim 8 wherein said separators are each composed of vertically extending zig zag plates having vertical crests and troughs.

10. The scrubber defined in claim 9, further comprising means for discharging a washing liquid into said plates.

* * * * *